United States Patent Office 3,507,164
Patented Apr. 21, 1970

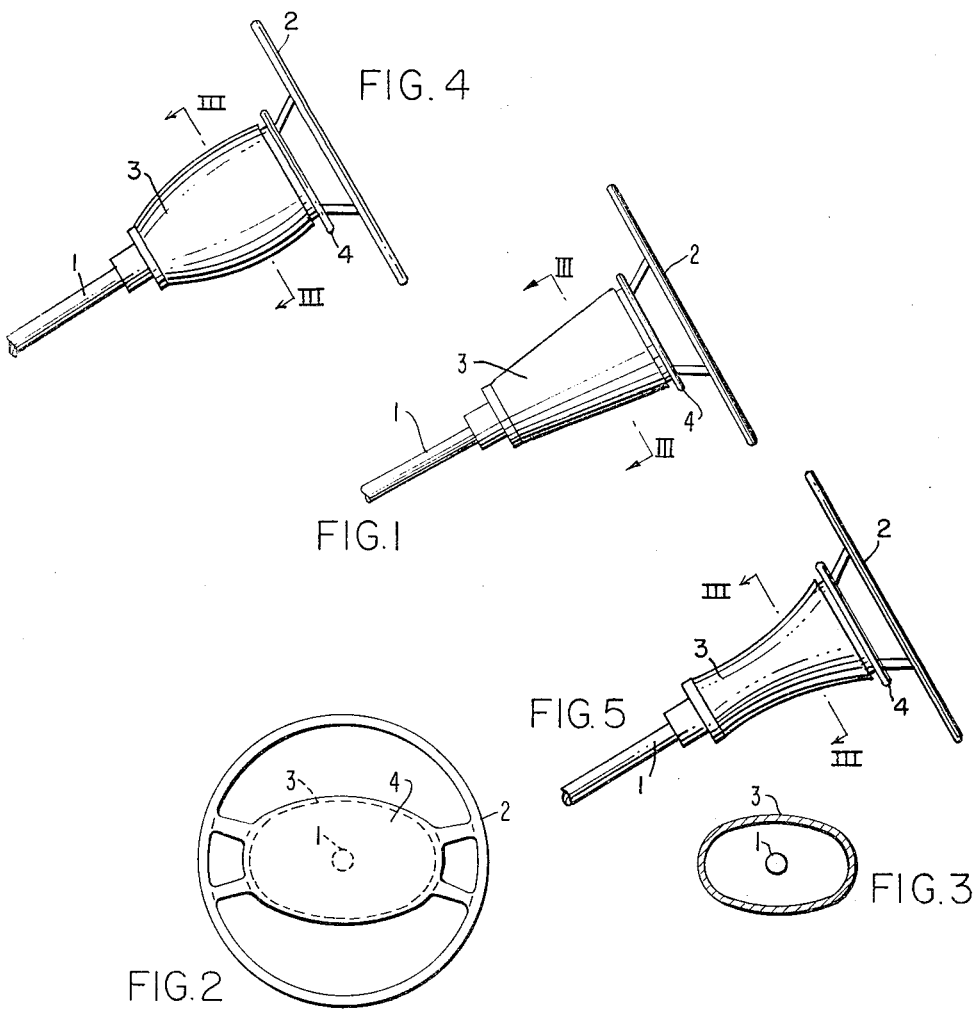

3,507,164
SAFETY STEERING FOR MOTOR VEHICLES
Karl Wilfert, Gerlingen-Waldstadt, and Béla Barényi, Stuttgart-Vaihingen, Germany, assignors to Daimler-Benz Aktiengesellschaft, Stuttgart-Unterturkheim, Germany
Filed Apr. 10, 1968, Ser. No. 720,047
Claims priority, application Germany, Apr. 11, 1967, D 52,758
Int. Cl. B62d 1/18
U.S. Cl. 74—492                                    15 Claims

ABSTRACT OF THE DISCLOSURE

A safety steering device for motor vehicles which includes a plastically deformable deformation member between the steering wheel and the steering spindle and in which the cross-sectional surface of the deformation member adjacent the steering wheel has a shape that is different from the circular shape with the major axis of the cross-sectional shape being substantially horizontal when the steering wheel is in the position corresponding to straight drive.

BACKGROUND OF THE INVENTION

The present invention relates to a safety steering device for motor vehicles in which a plastically deformable deformation member consisting, for example, of sheet metal is arranged between the steering wheel and the steering spindle, which in case of impact of the driver against the steering wheel caused by accidents, converts at least a part of the impact energy into deformation work and contributes thereby to the protection of the driver.

Such types of deformation members, which have also been referred to as impact pots, are known already in the prior art.

The known deformation members which may be constructed either cylindrically or conically, are provided consistently with a circularly shaped cross section. However, since it is of advantage for the absorption and transmission of the forces occurring during an impact of the driver against the steering wheel if the base surface of the deformation member facing the steering wheel is as large as possible, it would be favorable to provide deformation members whose base surface facing the steering wheel approximates the magnitude or size of the surface enclosed by the steering wheel rim.

However, in order not to impair the vision of the driver in the direction toward the road surface and the instruments of the vehicle, it is required, on the other, that as much free space as possible remains between a padding plate customarily covering the base surface of the deformation member facing the steering wheel and the part of the steering wheel rim disposed on top when driving straight.

SUMMARY OF THE INVENTION

In order to fulfill these differing requirements, a safety steering for motor vehicles is proposed with a plastically deformable member consisting, for example, of sheet metal, arranged between the steering wheel and the steering spindle in which according to the present invention at least the cross-sectional surface of the deformation member adjoining the steering wheel has a form deviating from the circular shape, for example, an oval or rectangular shape, and whereby the deformation member is so arranged that on straight drives the longer center axis of the cross-sectional surface of the deformation member adjoining the steering wheel is disposed horizontally.

The outer surface of the deformation member—as viewed in longitudinal cross section—may be constructed either rectilinearly or hyperbolically or may form a part of an elipse.

Accordingly, it is an object of the present invention to provide a safety steering which eliminates by simple means the aforementioned shortcomings and drawbacks encountered with the prior art constructions.

It is another object of the present invention to provide a safety steering device which increases the safety for the driver without impairing the visibility of the road and instrument panel.

A further object of the present invention resides in a safety steering device which has as large as possible a base surface facing the steering wheel while at the same time assuring good visibility of the instrument panel.

These and further objects, features, and advantages of the present invention will become more obvious from the following description when taken in connection with the accompanying drawing which shows, for purposes of illustration only, one embodiment in accordance with the present invention, and wherein:

FIGURE 1 is a side elevational view of a safety steering device in accordance with the present invention;

FIGURE 2 is a plan view on the steering wheel in the direction of the center axis of the steering spindle;

FIGURE 3 is a cross-sectional view taken along line III—III of FIGURE 1; and

FIGURES 4 and 5 are side elevational views of a safety steering device having curved shapes, being either convex or concave, in accordance with the present invention;

FIGURE 6 is a cross-sectional view, similar to FIGURE 3, in accordance with a modified embodiment of the present invention.

Referring now to the drawing wherein like reference numerals are used throughout the various views to designate like parts, reference numeral 3 designates a deformation member which is arranged between the steering spindle 1 and the steering wheel 2 of any conventional construction. The deformation member 3 is constructed conically and has an oval shape in cross section (FIG. 3) or can have a rectangular cross section (FIG. 6). The upper base surface of the deformation member 3 facing the steering wheel 2 is covered by a padding plate 4 whose form corresponds essentially to the cross-sectional shape of the deformation member 3.

The outer surface of the deformation member 3 may be constructed either conically as shown in FIGURE 1 or may have the curved shapes indicated in FIGURES 4 and 5, respectively.

By a suitable selection of the cross-sectional shape and of the form of the outer surface of the deformation member, the rigidity thereof against forces from different directions can be varied within wide limits, and more particularly in such a manner that the deformation member in case of bending stresses has a smaller form rigidity about the axis disposed horizontally in straight drives than in case of loads and stresses about the axis at that time disposed perpendicularly thereto.

While we have shown and described only one embodiment in accordance with the present invention, it is obvious that the present invention is not limited thereto but is susceptible of numerous changes and modifications as known to a person skilled in the art, and we therefore do not wish to be limited to the details shown and described herein but intend to cover all such changes and modifications as are encompassed by the scope of the present invention.

We claim:

1. A safety steering device for motor vehicles with a plastically deformable member arranged between the steering wheel and the steering spindle, characterized in that at least the cross-sectional surface of the deformation member adjoining the steering wheel has a shape deviating from a circular shape, and the deformation member is so arranged that on straight drives of the vehicle the longer center axis of said cross-sectional surface is disposed substantially horizontally.

2. A safety steering device according to claim 1, wherein said deformation member consists of sheet metal.

3. A safety steering device according to claim 1, wherein said cross-sectional surface is substantially oval.

4. A safety steering device according to claim 1, wherein said cross-sectional surface is substantially oblong.

5. A safety steering device according to claim 1, wherein said cross-sectional surface is substantially rectangular.

6. A safety steering device according to claim 1, wherein the outer surface of the deformation member, as viewed in longitudinal cross section, is substantially hyperbolic.

7. A safety steering device according to claim 6, wherein said cross-sectional surface is substantially oval.

8. A safety steering device according to claim 6, wherein said cross-sectional surface is substantially oblong.

9. A safety steering device according to claim 6, wherein said cross-sectional surface, taken at a right angle to the steering axis, is substantially rectangular.

10. A safety steering device according to claim 1, wherein the outer surface of the deformation member, as viewed in longitudinal cross section, forms substantially part of an elipse.

11. A safety steering device according to claim 10, wherein said cross-sectional surface is substantially oval.

12. A safety steering device according to claim 10, wherein said cross-sectional surface is substantially oblong.

13. A safety steering device according to claim 10, wherein said cross-sectional surface, taken at a right angle to the steering axis, is substantially rectangular.

14. A safety steering device according to claim 1, wherein said cross-sectional surface is covered in the direction toward the steering wheel by a padding plate having a shape essentially similar to said cross-sectional surface.

15. A safety steering device according to claim 14, wherein the surface of said plate is slightly larger than said cross-sectional surface.

References Cited

UNITED STATES PATENTS

| | | | |
|---|---|---|---|
| 3,167,974 | 2/1965 | Wilfert | 74—552 |
| 3,285,091 | 11/1966 | Fiala | 74—552 |

MILTON KAUFMAN, Primary Examiner

U.S. Cl. X.R.

74—552